June 24, 1947.    R. A. GOEPFRICH ET AL    2,423,015
BRAKE ADJUSTING MEANS
Filed Sept. 18, 1943    5 Sheets-Sheet 1

INVENTORS
BRYAN E. HOUSE
RUDOLPH A. GOEPFRICH
BY T. J. Plante

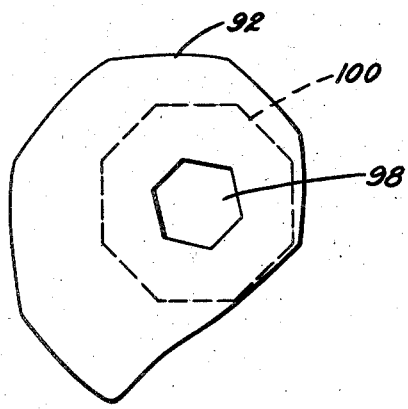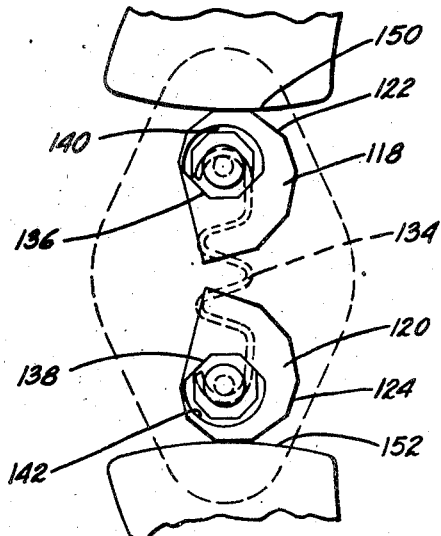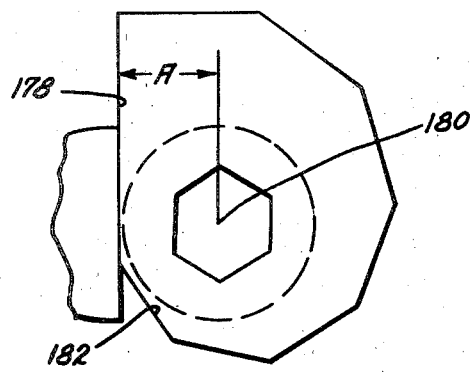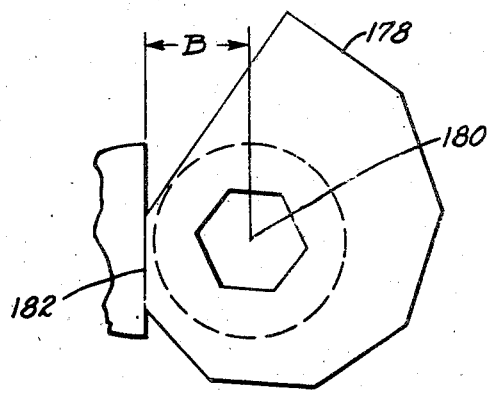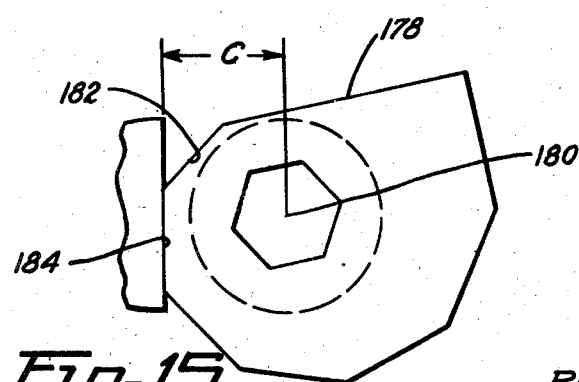

INVENTORS
BRYAN E. HOUSE
RUDOLPH A. GOEPFRICH
BY T. J. Plante

June 24, 1947. R. A. GOEPFRICH ET AL 2,423,015
BRAKE ADJUSTING MEANS
Filed Sept. 18, 1943 5 Sheets-Sheet 5
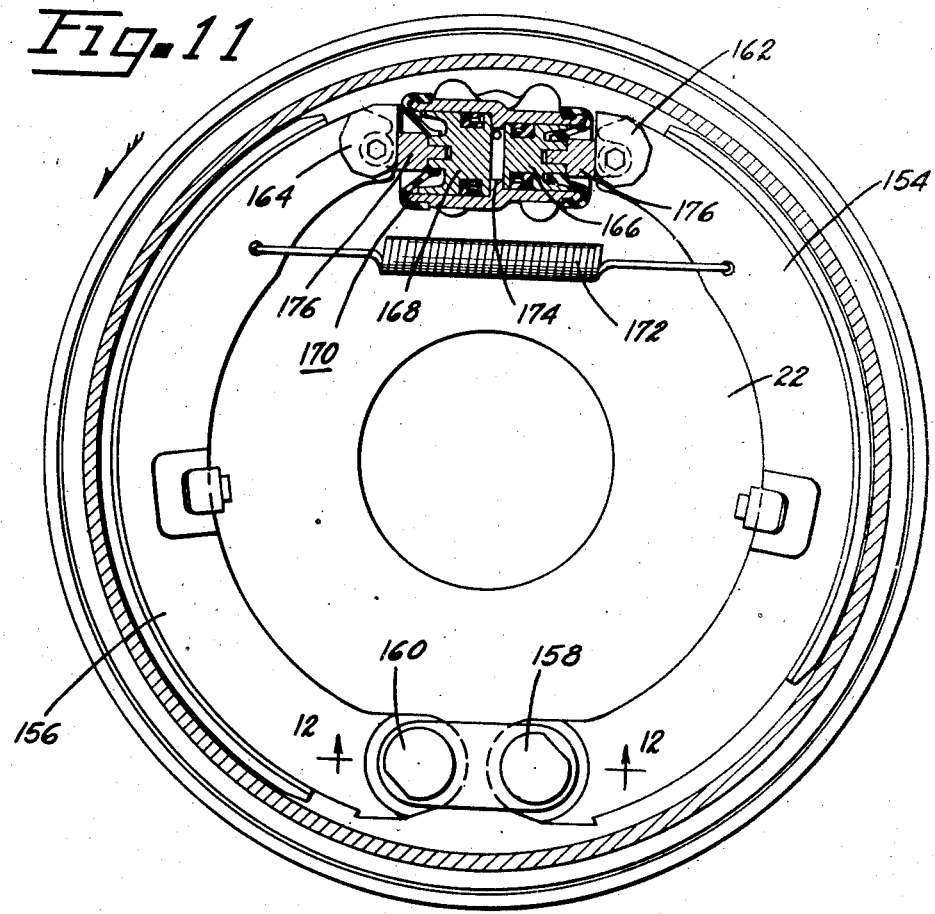
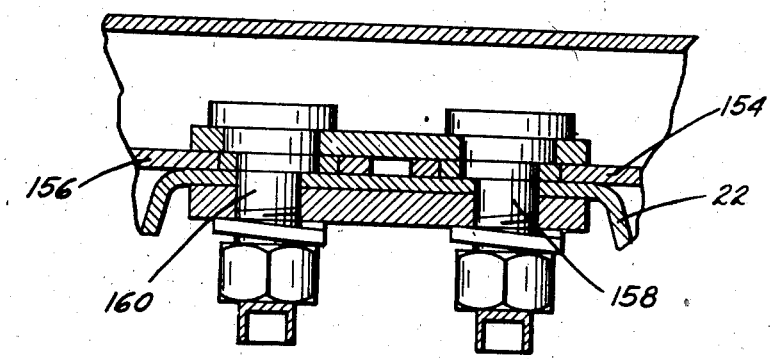
INVENTORS
BRYAN E. HOUSE
RUDOLPH A. GOEPFRICH
BY T. J. Plante Patented June 24, 1947

2,423,015

UNITED STATES PATENT OFFICE 2,423,015

BRAKE ADJUSTING MEANS

Rudolph A. Goepfrich and Bryan E. House, South Bend, Ind., assignors to Bendix Aviation Corporation, South Bend, Ind., a corporation of Delaware Application September 18, 1943, Serial No. 502,858

26 Claims. (Cl. 188—79.5)

This invention relates to brake adjustors, and particularly to adjustors which are adapted to adjust the released positions of the shoes in brakes of the type having a drum and internal expanding shoes.

The current practice in brake adjusting is the use of an adjusting screw having its stem screwed into either a shoe member or an anchored member relative to which the shoe is moved and its head constituting a star wheel the flat of which rests against the other of the members and the periphery of which is turned by an adjusting tool to vary the distance between the shoe member and the anchored member. This adjusting procedure is slow and tedious, and the threads sometimes freeze, or become locked, due to rusting, thereby making it almost impossible to further adjust the brake.

An object of the present invention is to provide an adjustor which will make the adjusting of brakes to compensate for wear a much quicker operation than has heretofore been the case.

A further object of the present invention is to simplify and make easier the adjusting of brakes.

A still further object of the present invention is to provide a brake adjustor having fewer parts and therefore less expensive and easier to manufacture than current adjustors.

A still further object of the present invention is to provide an adjustor which will have the inherent quality of tending to prevent overadjustment of the brakes, regardless of any lack of skill of the service mechanic.

The invention may be further briefly summarized as consisting in certain novel combinations and arrangements of parts hereinafter described and particularly set out in the appended claims.

In the accompanying drawings:

Figure 6 is a closeup of the adjustor of Figures 4 and 5;

Figure 7:
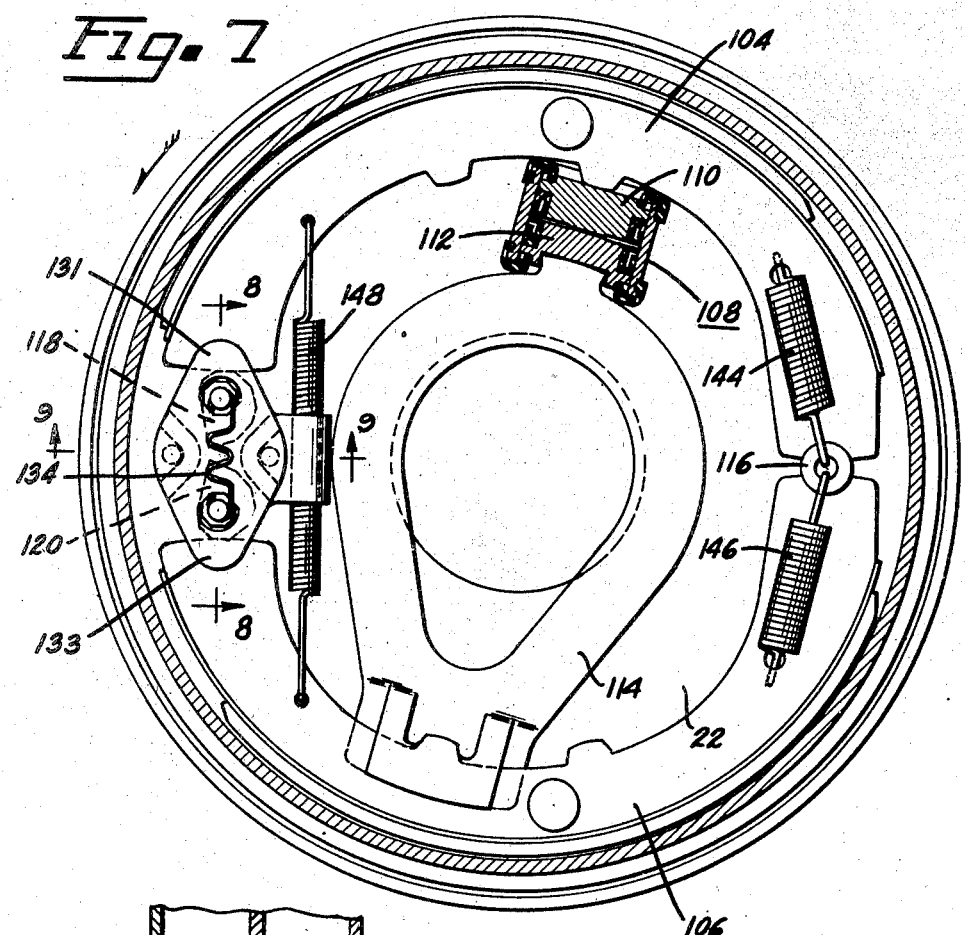
Figure 7 is another view of a full brake assembly showing how our improved adjustor may be used with a third type of brake.
Figures 8, 9:
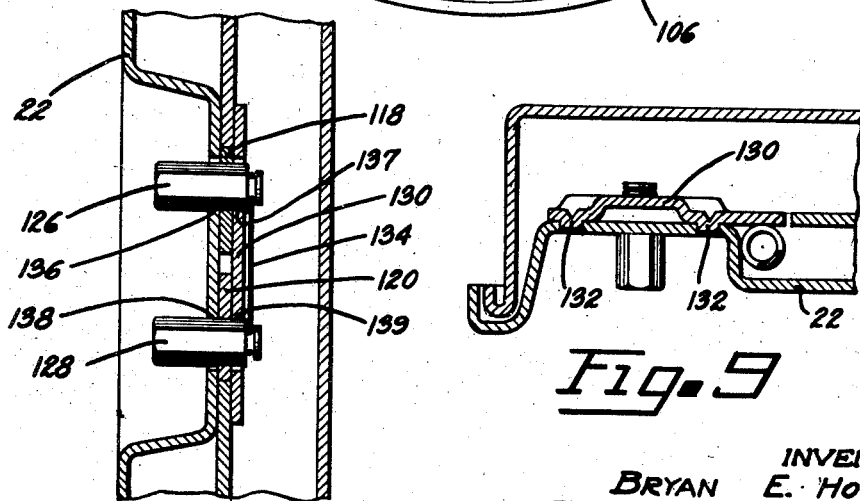

Figures 8 and 9 are sections taken on the lines 8—8 and 9—9, respectively, of Figure 7;

Figure 10 is a closeup of a portion of the brake assembly of Figure 7, showing the adjustor more clearly;

Figure 11 is a view of a brake assembly showing our improved brake adjustor applied to yet another type of brake;

Figure 12 is a section taken on the line 12—12 of Figure 11; and

Figures 13 to 15, inclusive, are enlarged elevational views showing an adjustor having successive surfaces of engagement providing different increments of adjustment for initial and service adjustments.

Our improved adjustor and the principles underlying use of the same are applicable to all types of brakes, that is, to all brakes regardless of the arrangement of the brake friction members, or shoes. In order that this fact may be clearly demonstrated, and in order, further, to give a clear and readily understandable explanation of our invention, we have illustrated our adjustor as it might be incorporated in several brake assemblies, having different fundamental characteristics. It must be understood that the application of our invention is not limited to the uses illustrated in this specification.

Figure 1:
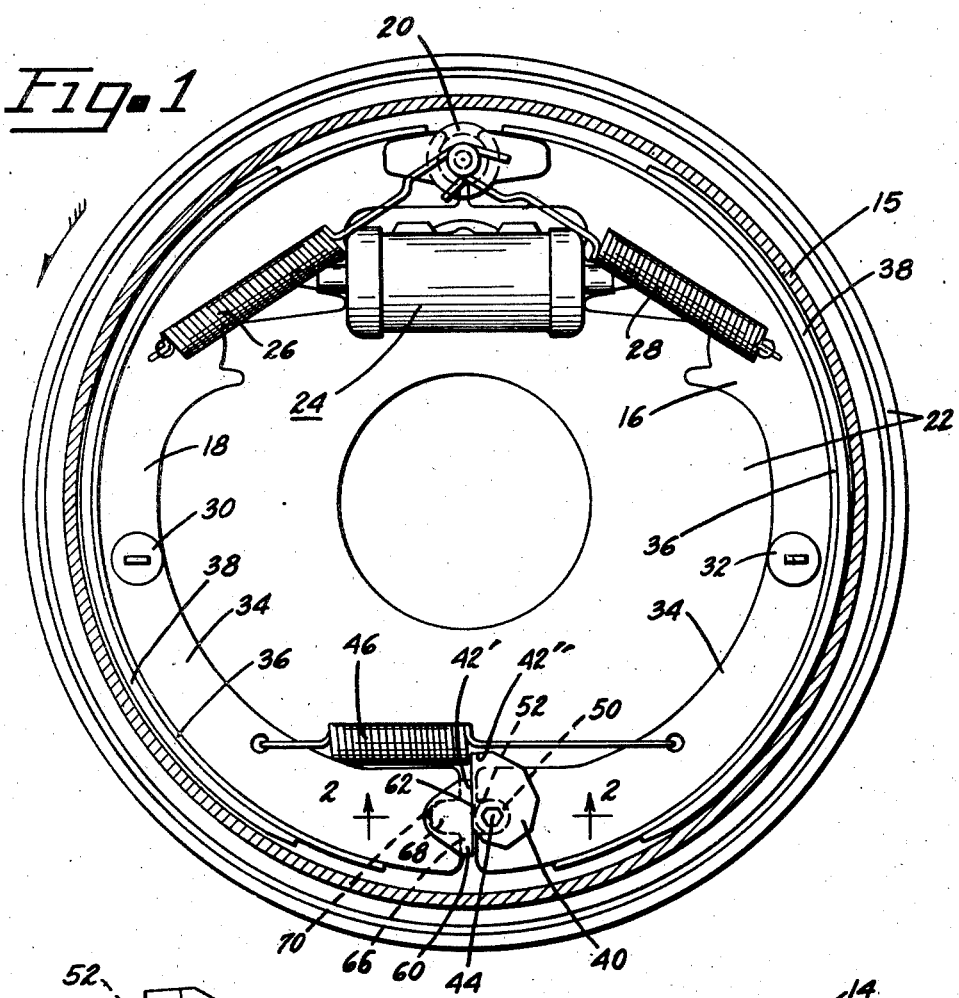
Figure 1 is a vertical section taken through a brake drum, and showing the shoes and adjustor in side elevation.
Figure 2:
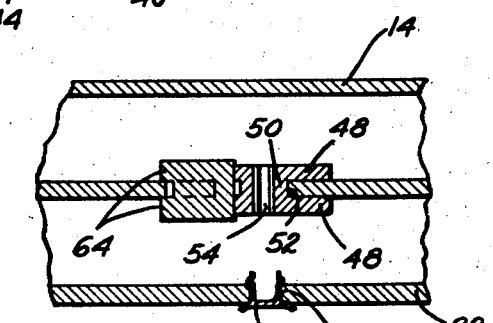
Figure 2 is a section taken on the line 2—2 of Figure 1.

In the brake of Figures 1 and 2, a rotor or brake drum 14 having a generally cylindrical braking flange 15 is adapted to be slowed and stopped by means of an expansible friction device which comprises two shoes 16 and 18. An anchor 20, fixed to a backing plate or stationary torque-taking support member 22, is adapted to transmit to the member 22 the torque of the friction device regardless of the direction of drum rotation when the friction device is moved into engagement therewith by the hydraulic actuator 24 (also mounted on the member 22). Thus, if the shoes are spread into engagement with the drum when the drum is rotating in the direction indicated by the arrow, the upper end of shoe 16 will anchor against anchor 20 and shoe 18 will "serve" shoe 16, in the sense that it will tend to rotate with the drum due to friction therebetween and will thus exert a strong force on the lower end of shoe 16 tending to press it more firmly against the drum. If the drum is rotating in the opposite direction, shoe 18 will anchor against anchor 20 and shoe 16 will "serve" shoe 18. Conventional return springs 26 and 28 are provided to return to retracted position against anchor 20 whichever shoe has left the same during brake application. Also, hold down members 30 and 32 are provided to prevent excessive movement of the shoes away from the backing plate.

Each of the shoes 16 and 18 may comprise a web portion 34 substantially parallel to the backing plate 22, a rigid substantially arcuate rim portion 36 normal to the web portion and substantially parallel with the cylindrical flange 14 of the drum, and a friction material facing or lining 38 secured to the rim and engageable with the drum 14. It is this lining portion 38 which wears most readily and gradually decreases in thickness, requiring a brake adjustment to bring the shoes nearer the drum and thus conserve pedal travel at the other end of the hydraulic force transmitting system.

Mechanism is provided for adjusting the relative positions of the shoes to compensate for wear of the lining and also for transmitting force between the non-anchoring (in this case the lower) adjacent ends of the shoes. This mechanism comprises an element 40, also called an adjustor, which has a plurality of surfaces of engagement 42 formed along its periphery and a pivotal center or axis of rotation at 44. Starting with the surface of engagement 42', which is nearest the pivotal axis 44, the successive surfaces of engagement are located at gradually increasing radial distances from said pivotal axis, the surface of engagement 42" being farthest from said axis. A selected one of the surfaces of engagement 42, depending upon the spread required between the lower ends of the shoes to maintain the proper clearance between shoe lining and drum, is maintained in engagement with shoe 18, a spring 46 constituting resilient means for drawing the lower ends of the shoes toward one another.

The adjustor 40 may conveniently comprise two identical polygon shaped plate-like members 48 located on opposite sides of the web of shoe 16, and connected together by a cylindrical shaft 50. The shaft which is either integral with or secured to the plate-like members, is the means whereby the adjustor is pivoted on the shoe 16, the end of the web of the shoe having a substantially semi-circular notch 52 cut therein to receive and provide a bearing for the shaft 50. The shaft 50 has an opening 54 therein of polygonal cross-section, for the insertion of a turning tool having a complementary conformation, an opening 56 being provided in the backing plate for the insertion of such a tool from outside the brake. A plug 58 normally closes the opening to prevent dust or other extraneous matter from getting inside the brake.

In order that the shoes 16 and 18 may be identical and therefore interchangeable, we provide a member 60 which serves as a companion piece to the adjustor 40. The member 60 is provided with a surface of engagement 62 against which the adjustor 40 is held by spring 46. The member 60 is also provided with extended side portions 64 which embrace the web of shoe 18, and with a center portion having flanges 66 which engage the end of the shoe web and also having a projection 68 extending into the notch 70 to maintain the member 60 in position. It will be appreciated that the notch 70 in shoe 18 is the same in form as the notch 52 in shoe 16. Since the conformation of the two shoes is in all respects the same, they may be quickly and inexpensively manufactured in the same manner and with the same machine. It would, of course, be possible to so form the lower ends of the shoe webs that the extra piece 60 would not be necessary and the polygon adjustor 40 would bear directly against shoe 18. However, this would make it harder to have interchangeable shoes. It would even be possible to so design the brake shoes as to avoid use of the member 60 and at the same time have interchangeable shoes, but this might increase the cost of making the shoes.

When it is desired to adjust the positions of the shoes to compensate for wear of the shoe lining, the plug 58 is first removed, and the adjusting tool is then inserted into the opening 54 of shaft 50, and turned to rotate the shaft and the polygon adjustor, causing the adjustor to ride over a corner on its periphery and bring the next surface of engagement 42 into contact with the surface of engagement 62 of the member 60. Inasmuch as the new surface of engagement 42 which is brought into contact with surface 62 by rotation of the polygon is spaced somewhat farther from the pivotal center 44 than the surface of engagement 42 which was previously in contact with the surface 62, the lower ends of the shoes 16 and 18 will be spread apart, moving them outward toward the drum, and taking up excessive clearance. Rotation of the polygon adjustor is accomplished against the force of spring 46, but this force is relatively light, since its primary purpose is merely to hold the element 40 and the member 60 together. During brake application a much greater force will be transmitted between the lower ends of shoes 16 and 18, owing to the "serving" effect of one shoe on the other. The polygon adjustor must be so designed that its peripheral surfaces or surfaces of engagement 42 each have sufficient area to withstand the load during brake application.

From the above description of operation of the polygon adjustor, it will be appreciated that the adjustment procedure has been quickened and simplified both because a large amount of clearance may be taken up relatively quickly, and because it is less difficult to insert the adjusting tool into the opening 54 than it is to find the teeth of a star wheel with an adjusting tool.

Although our improved adjustor does not provide quite so fine an adjustment as a star wheel adjusting screw, our adjustor is very satisfactory when the brake shoes are to be actuated by means of a hydraulic force transmitting system. In hydraulic brakes there is less need for close adjustment than in a rigid mechanical hookup because, in the hydraulically actuated brake, the applying pressures are automatically equalized. Thus, in a hydraulic system, if a brake in one of the wheels has more clearance than a brake in one of the other wheels, the brake torque development nevertheless will be equal in both brakes because the applying pressures are equal. Conversely, in a rigid hookup mechanically actuated brake system, that brake with the least clearance will contact the drum first and might develop its full torque before the brake with the larger clearance comes into operation.

The increment of brake adjustment which is obtained by turning the polygon adjustor from one surface of engagement 42 to the next surface of engagement 42 can be varied almost at will. The perpendicular distance from the center 44 to the surface of engagement 42 determines the spread of the shoes at that particular adjustment, and thus the difference between distances of adjacent faces 42 from the center determines the increment of adjustment. The adjustments may be equal with successive surfaces of the polygon or they may vary in size. We prefer to provide an adjustor which, when moved from one face to the next, will give an increment of adjustment sufficient to compensate for the amount of lining wear substantially equivalent to one brake pedal stroke. Thus, if after the lining thickness had decreased $\frac{1}{32}$ of an inch, the pedal approaches the floor board of the vehicle without bringing the shoes into contact with the brake drum, the increment of adjustment should be approximately $\frac{1}{32}$ of an inch. This does not mean that the difference in distance of consecutive faces 42 from center 44 must equal $\frac{1}{32}$ of an inch, but instead that it be "equivalent" in the sense that it will compensate for that amount of lining wear and fully adjust the shoes. The percentage of pedal stroke which corresponds to an increment of adjustment may be determined according to the manufacturer's desire. For example, he may wish to provide an adjustor which will bring the brake into full adjustment with a single increment of adjustment, provided adjusting is done after $\frac{2}{3}$ of the pedal stroke has been used. The increment of adjustment of the polygon adjustor would then be made such that it would take up an amount of shoe clearance equivalent to $\frac{2}{3}$ of a pedal stroke. When the brake linings have worn to this extent, a simple turn of the polygon adjustor from one surface of engagement to the next will bring the shoes into their fully adjusted position. The quickness and ease of this procedure is quite obvious.

It is important that the line of force through the polygon adjustor 40 pass through the face or surface of engagement of the adjustor which rests against the surface 62 (or other engaging member in other types of brake) in the particular stage of adjustment. If this line of force misses the surface of engagement 42 which it is desired to maintain in contact with the surface 62, there will be a turning moment tending to change the engaging face or surface of the adjustor and thereby change the adjustment of the brake. We therefore provide an adjustor which is so formed as to cause the line of force thereacross to pass through the particular surface of engagement 42 which represents the instant stage of adjustment. To this end, the adjustor 40 is so shaped that a perpendicular dropped from the pivotal axis or center 44 to the surface 62 of member 60 will pass through whichever surface of engagement 42 is at the time in contact with surface 62. This principle is illustrated particularly in Figure 3, wherein dotted lines represent perpendiculars drawn from the axis 44 to the several faces of engagement 42. Inasmuch as the various surfaces of engagement are flat, they will lie along the surface 62 whenever they are brought into contact with it, and therefore a line perpendicular to a given surface of engagement 42 will also be perpendicular to the surface 62 whenever the given surface of engagement 42 is brought into contact with surface 62. The length of the surfaces of engagement 42 will vary according to the necessity of design, the reason for variance being the necessity of having the line of force passing through the engaging face. Changing the number of faces or surfaces of engagement 42 will, of course, vary the length of all the faces of the polygon adjustor.

An important advantage of our improved adjustor is that its use inherently tends to prevent overadjustment of the brake. This is true because the corner between any two consecutive faces 42 is farther from the axis 44 than either of said faces, and consequently the adjustor as it is rotated must ride over the corner and drop back slightly when the new surface of engagement is brought into position to engage the surface 62. We prefer to provide an adjustor having a conformation such that the difference between the distance from the axis 44 to a corner between successive faces of the adjustor, on the one hand, and the distance from said axis to the more distant of the two faces forming said corner, on the other hand, will be approximately equivalent (not necessarily equal) to the clearance which it is desired to maintain at all times between the brake shoes and the brake drum in order to prevent dragging of the brakes. We have thus provided what amounts to an automatic means for assuring proper clearance after adjustment of the brakes. Heretofore it has been necessary to bring the shoes into full contact with the drum and then to back them off sufficiently to provide the desired clearance. We have provided adjusting means which makes the backing off of the shoes unnecessary. It will be appreciated that this advantage constitutes a further simplification of the brake adjusting procedure.

Figure 3:
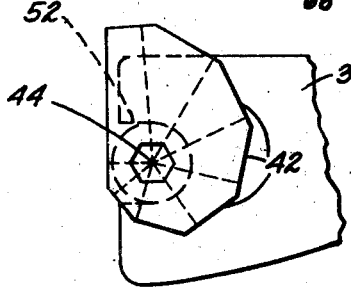
Figure 3 is a closeup of the adjusting element of Figures 1 and 2 having dotted lines to illustrate a certain fundamental principle of our invention.
Figure 4:
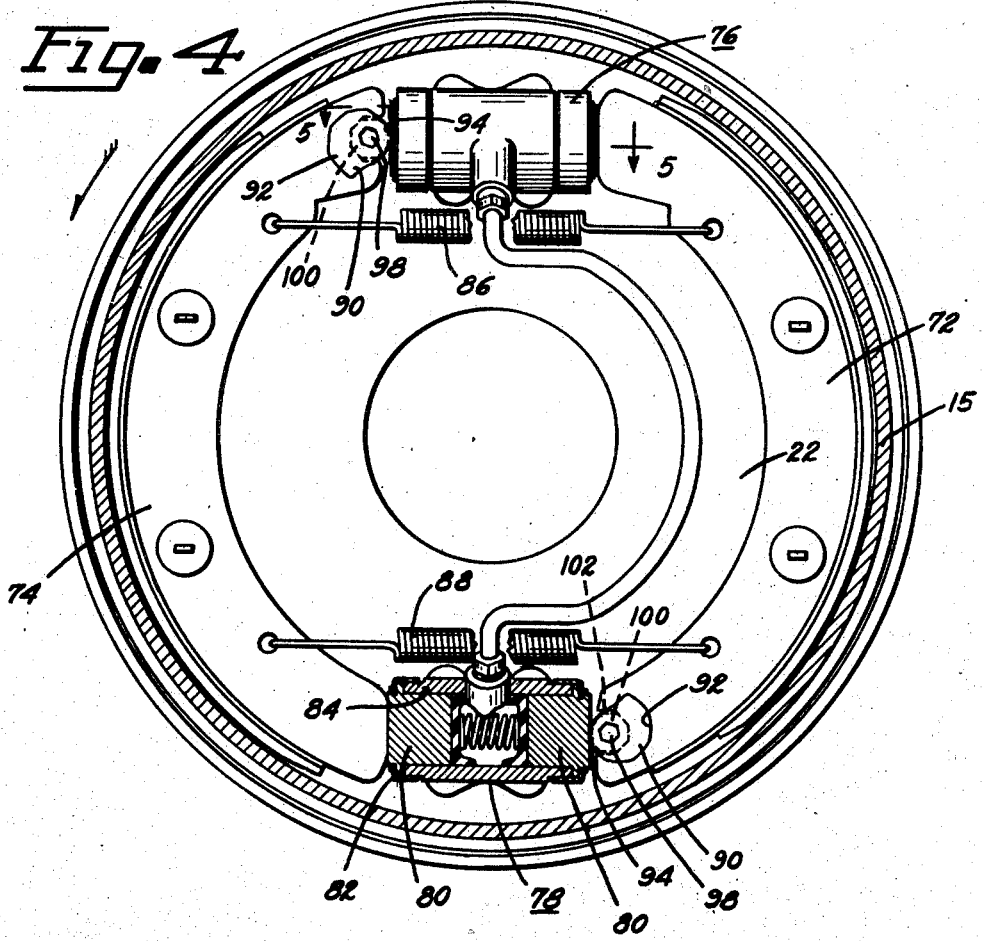
Figure 4 is a vertical section taken through a brake assembly showing how our improved adjustor may be applied to a type of brake different from that shown in Figure 1.
Figure 5:
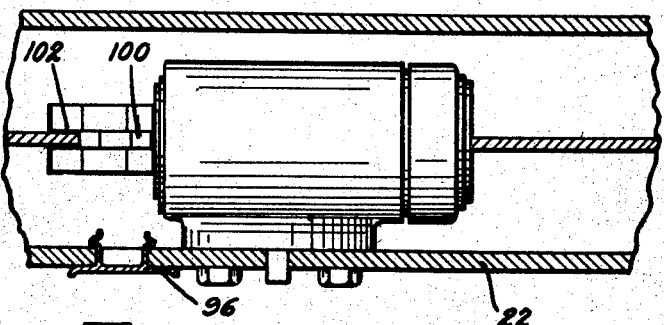
Figure 5 is a section taken on the line 5—5 of Figure 4.

Figures 4 to 6 inclusive illustrate the use of our improved adjustor in conjunction with a different type of brake. The adjustor shown in Figures 4 to 6 is also slightly different from the adjustor of Figures 1 to 3. However, the adjustor of Figure 1 is applicable also to the brake of Figure 4, or indeed, any type of brake whatsoever, and the adjustor of Figures 4 to 6 is equally applicable to all types of brake. It is illustrated in Figures 4 to 6 merely because that is a convenient place for such illustration.

The brake shown in Figures 4 and 5 includes two individually shiftable shoes 72 and 74, each of which anchors at one end or the other depending on the direction of drum rotation at the time of brake application. The brake is provided with two hydraulic actuating cylinders 76 and 78 which, in this instance, provide both applying and anchoring means for the shoes. The pistons 80 (two being provided in each cylinder) are adapted to be spread by hydraulic pressure from a conventional hydraulic system to force the shoes against the drum 15. Friction between the shoes and the drum causes one end of each shoe to anchor, the anchoring torque being transmitted through the flange 82 of the respective piston and the wall 84 of the respective cylinder to the backing plate 22 on which each of the cylinders is fixedly mounted. Return springs 86 and 88 bias the shoes to released position.

An adjustor 90 is provided for each of the shoes. We prefer to pivot the adjustors on the respective shoes, and permit their peripheral surfaces of engagement 92 to contact the outer surfaces 94 of the respective pistons. The backing plate has two openings 96 therein, each opposite one of the adjustors, to permit insertion of an adjusting tool into the opening 98 in the adjustor shaft, in order that the adjustor may be rotated.

The differences between the adjustor shown in Figures 4 to 6 and the adjustor shown in Figures 1 to 3 may be explained and described as follows:

As the shoes 72 and 74 (this is also true of shoes 16 and 18 of Figure 1) move into drum engaging position, there is movement of the polygon adjustor relative to its contacting surface (in Figure 4 the surface 94, in Figure 1 the surface 62) tending to cause the adjustor to rotate due to the moment of the friction (between the surface of engagement of the adjustor and the contacting surface) about the rotational center of the adjustor. Although no trouble has been encountered with such unwonted rotation of the adjustor in the type having the round shaft or axis as shown in Figure 1, it may be desired to provide an adjustor having a polygonal shaft 100 as illustrated in Figures 4 to 6 inclusive. Such a polygonal shaft, when inserted, as shown, in a complementary multi-sided groove 102 formed in the end of the shoe, effectively prevents unwonted turning of the adjustor, the complementary groove provided in the end of the shoe acting as a wrench-like pocket for the shaft.

The surfaces of engagement 42 of the round shaft type of polygon adjustor are flat, as shown in Figures 1 to 3. During brake engagement the shoe can rotate about the round shaft, a slight rotation of the shoe being necessary in order to bring it properly into contact with the drum, particularly if the shoe is anchoring at the adjustor end. In the adjustor having a polygonal shaft, as shown in Figures 4 to 6, the shoe is prevented from rotating about the shaft because the polygonal sides of the shaft engage similar flats in groove 102 at the end of the shoe. Therefore, the faces or surfaces of engagement 92 of the adjustor shown in Figure 4 are curved outwardly slightly in order that, during brake application, the shoe may pivot or roll somewhat on the face of the adjustor. See Figure 6 for an enlargement disclosing fully the use of the polygonal shaft 100 with the adjustor having slightly outwardly curved surfaces of engagement 92.

Figures 7 to 10 show how our invention may be applied to a brake of still another type. This brake includes two shoes 104 and 106 which are individually shiftable to anchor at either end according to the direction of drum rotation at the time of shoe-to-drum contact. Another way of stating this is to say that each of the shoes is a "self-energizing" or "leading" shoe regardless whether the vehicle, and hence the drum, is moving forwardly or rearwardly.

The brake of Figures 7 to 10 inclusive is similar to the brake of Figures 4 to 6 inclusive in the sense that both shoes are self-energizing in both directions of movement, but the anchoring and applying means are different. In Figures 7 to 10 the shoes are applied by a hydraulic actuator 108 having a piston 110 engaging the web of shoe 104 and a piston 112 engaging a yoke-like thrust-transmitting member 114 which extends diametrically across the brake to engage the web of shoe 106. The effect of forcing fluid under pressure into cylinder 108 is to exert a direct radially outward thrust on each of shoes 104 and 106. An anchor 116 is located between the shoes at one end thereof and is fixed to the backing plate in order that it may receive and absorb the anchoring torque of the shoes. At the other end of the shoes the polygon adjustors 118 and 120 (see Figure 10 for the closeup view), having surfaces of engagement 122 and 124 respectively, serve as anchors for the shoes. The surfaces of engagement of the adjustors contact the shoes while the polygonal shafts 126 anad 128 anchor the adjustors to the backing plate 22. The polygon adjustors 118 and 120 in this arrangement constitute single plates supported between the backing plate 22 and a bracket-like retaining member 130 which has nibs 132 secured to the backing plate by brazing or the like. The ends 131 and 133 of retaining member 130 may be arranged to serve as hold down means for the brake shoes. Retracting springs 144, 146 and 148 bias the shoes to released position.

Since one or the other of the shoes (depending on the direction of drum rotation) will move out of contact with its associated adjustor when the brakes are applied, means are provided for preventing the adjustors from leaving their anchorage to follow the shoes and also for preventing the adjustors from unwonted turning due to vibration or the like while the shoes are out of contact with the adjustors. A tension spring 134 connected to the two shafts 126 and 128 holds them against the inner edges 136 and 138 respectively of holes in the backing plate 22 and the inner edges 137 and 139 respectively of holes in the retaining member 130 through which said shafts extend. The inner edges of the holes have a plurality of flat sides complementary to the peripheries of the respective shafts, thereby preventing the shafts from unwonted turning. The holes have outer edges 140 and 142 which provide sufficient clearance for the respective shafts to be turned when it is desired to adjust the shoes to take up excessive clearance. A hollow adjusting wrench may be used for this purpose.

In the brake of Figures 7 to 10, the polygon adjustors may have flat faces 122 and 124 and at the same time the octagon shaped shafts 126 and 128 may be used without interfering with proper movement of the shoe toward the drum. This is true because it is possible to have the ends 150 and 152 of the shoes curved or arcuate in shape to take care of turning of the shoes into the drum.

The brake shown in Figures 11 and 12 comprises shoes 154 and 156 pivoted at 158 and 160, respectively, on the backing plate 22. In this type of brake, we prefer to pivot the adjustors 162 and 164 on the respective shoes, and have their peripheral surfaces of engagement maintained in engagement with the pistons 166 and 168, respectively, of hydraulic actuator 170, which itself is mounted on backing plate 22. A retracting spring 172 biases the shoes and pistons to released position, the pistons in released position abutting a flange 174 formed in the interior of the hydraulic actuator.

The pistons may each be provided with inserts 176 which directly contact the adjustors. Use of the inserts 176 simplifies manufacture of the pistons, and makes possible the employment of metals having different properties best adapted for particular functions, such as aluminum for the pistons and steel for the inserts.

Figures 13 to 15 inclusive show, in three different stages of adjustment, a polygon adjustor having a small lift at the start for initial adjustment to compensate for manufacturing tolerances, and subsequent coarser adjustments to compensate for lining wear. Although the number of adjustments in the first series, i. e., to compensate for manufacturing tolerances, may vary at will, we show only one such adjustment, followed by a series of service adjustments to compensate for lining wear. Thus, in Figure 13, the position of the adjustor with respect to an engaging member is shown prior to any adjustment. The face 178 of the adjustor is in contact with the engaging member, and the distance "A," which represents the distance from the axis 180 to the engaging member, constitute a convenient representation of the total amount of adjustment or spread. In Figure 14, face 182 of the adjustor is in contact with the engaging member, and the distance "B" represents the total amount of adjustment, the difference between "B" and "A" representing the increment of adjustment. In Figure 15, the face 184 is in contact with the engaging member, and the distance "C" represents the total amount of adjustment. It will be noted, if the distances are measured, that the increment of adjustment represented by the difference between "C" and "B" is somewhat greater than that represented by the difference between "B" and "A," the latter being the initial adjustment to compensate for manufacturing tolerances and the former being the first service or coarse adjustment to compensate for lining wear.

Although several possible adaptations of our invention have been illustrated in this specification, it is our intention not to limit the scope of our invention to the uses illustrated, but rather to include in such scope all adaptations and uses which properly come within the terms of the appended claims.

Furthermore it is our intention that the terms about to be defined be broadly interpreted in accordance with the following definitions whenever and wherever they appear in the specification and claims of this application. When referring to a "substantially non-rotatable member," we may be referring to any part of the brake assembly except the brake drum, i. e., we may be speaking of a shoe, a backing plate, a hydraulic actuating cylinder, or any part which is unable to rotate with the brake drum. When the term "anchored member" is used to indicate the member against which the periphery of the adjustor bears, it broadly covers the member 60 of Figure 1, the pistons 80 of Figure 4, the members 176 of Figure 11, and any member or part which, in released position of the brake, cooperates with the adjustor to space the shoe from a fixed part of the brake assembly. The word "shoe" is to be broadly interpreted as the stator of a brake assembly, or as the friction element thereof, and the word "drum" is to include all brake rotors regardless of specific form. The term "spring" is to include all substantially equivalent resilient mechanism. The term "substantially flat," when applied to the surfaces of engagement of the polygon adjustor is to include both the faces of the adjustor of Figure 1 and the slightly curved faces of the adjustor of Figure 4. "Equivalent," where used in described the relationship between the increment of adjustment provided by successive faces of the adjustor and the lining wear representing a certain pedal stroke, and where used in describing the relationship between the distance of the corners of the adjustor periphery and the clearance between shoe and drum after adjustment, does not mean "equal" in the sense that the distances are the same by absolute dimensional measurement, but rather means that certain distances may be said to correspond in value when the designs and dimensions of intervening and associated parts are taken into account. When referring to the "ends" of the shoes, the intention is not to limit to exact location, but functionally merely. The term "shaft" is intended to include the part which is turned to turn the adjustor, regardless whether round as shown in Figures 1 and 11 or polygonal as shown in Figures 4 and 7.

We claim:

1. In a brake having a rotatable member and a substantially non-rotatable member movable into frictional engagement with said rotatable member to resist rotation thereof, means for adjusting the released position of said substantially non-rotatable member comprising an element movable to effect relative movement between said substantially non-rotatable member and a second substantially non-rotatable member, said element having the outline of an irregular polygon, the edges of which constitute a plurality of substantially flat intersecting surfaces of engagement thereon, a selected one of which engages a substantially flat surface of one of said substantially non-rotatable members when the brake is released, said element being movable to change the surface of engagement which is in contact with said substantially non-rotatable member, thereby effecting relative movement between said substantially non-rotatable members and adjusting the released position clearance between the first of said substantially non-rotatable members and the rotatable member.

2. In a brake having a generally cylindrical rotor, a generally arcuate stator radially movable into frictional engagement with said rotor to resist rotation thereof, and an anchored member, means for radially adjusting the released position of said stator comprising an element movable to effect relative movement between said stator and the anchored member, said element having the outline of an irregular polygon, the edges of which constitute a plurality of surfaces of engagement of varying length, a selected one of which is maintained in contact with the anchored member when the brake is released, said element being movable to change the surface of engagement which is in contact with said anchored member, thereby effecting relative movement between the stator and the anchored member and adjusting the released position clearance between the stator and the rotor.

3. In a brake having a drum, a shoe movable into frictional engagement with said drum, a stop which limits the return of the shoe to released position, and resilient means urging the shoe to released position, an adjustor having a shaft portion and a portion movable with said shaft having a plurality of distinct surfaces of engagement formed successively along its periphery of gradually increasing length and at gradually increasing radial distances from the shaft, said adjustor being so positioned that the position of the shoe relative to the stop is determined by the distance between the shaft and the periphery of the adjustor, said shaft being movable to turn the adjustor, bringing a different surface of engagement into line with the shoe and stop, and thereby changing the released position of the shoe.

4. In a brake having a rotatable drum and a substantially non-rotatable member movable into frictional engagement with said drum to resist rotation thereof, means for adjusting the released position of said member comprising an element movable to effect relative movement between said member and another substantially non-rotatable member, said element being pivoted on one of said members and having a plurality of substantially flat intersecting surfaces of engagement on its periphery at varying radial distances from its pivotal axis, the radial distances of said surfaces of engagement from the pivotal axis of said element being gradually increased around substantially the entire periphery of the element in order to provide a maximum number of varying radial distances, a selected one of said surfaces being maintained in contact with the other of said members when the brake is released, said element being movable about its pivotal axis to bring a different surface of engagement into contact with said member, changing the distance between said member and the pivotal axis of said element and thereby adjusting the relative positions of said substantially non-rotatable members.

5. In a brake having a substantially non-rotatable member adapted to be moved into frictional engagement with a rotatable drum to resist rotation thereof: means for adjusting the released position of said member comprising an element movable to effect relative movement between said member and another substantially non-rotatable member, said element being pivoted on one of said members and having a plurality of substantially flat surfaces of engagement formed successively along its periphery at gradually increasing radial distances from its pivotal axis, a selected one of said surfaces being maintained in contact with the other of said members when the brake is released, said element being movable about its pivotal axis to bring a different surface of engagement into contact with said member, changing the distance between said member and the pivotal axis of said element and thereby adjusting the relative positions of said substantially non-rotatable members, said surfaces of engagement being so formed as to be capable of rectilinear sliding movement relative to the member which they contact.

6. In a brake having a rotatable drum, a substantially non-rotatable member movable into frictional engagement with said drum to resist rotation thereof, actuating means for moving said member into frictional engagement with said drum, resilient means yieldably opposing said actuating means and normally maintaining said member out of contact with said drum, and a second substantially non-rotatable member having a surface of engagement thereon, an adjustor for adjusting the released position of the first member comprising an element movable to effect relative movement between the first member and the second member, said element being pivoted on the first member and having a plurality of distinct surfaces of engagement formed successively along substantially its entire periphery at gradually increasing radial distances from its pivotal axis, a selected one of said surfaces of engagement of said element being maintained in contact with the surface of engagement of the second member, the structure of said element being such that a perpendicular from the pivotal axis of said element to the surface of engagement of said second member passes through whichever surface of engagement on the periphery of said element is at the time in contact with the surface of engagement of said second member, said element being movable about its pivotal axis to bring a different surface of engagement of said element into contact with the surface of engagement of said second member, changing the distance between said second member and the pivotal axis of said element and thereby adjusting the relative positions of said first and second members.

7. In a brake having a drum, a shoe movable into frictional engagement with said drum to resist rotation thereof, actuating means for moving said shoe into frictional engagement with said drum, resilient means yieldably opposing said actuating means and normally maintaining said shoe in released position out of contact with said drum, and an anchored member having a surface of engagement thereon, an adjustor for adjusting the released position of the shoe to compensate for shoe wear comprising an element movable to effect relative movement between the shoe and the anchored member, said element being pivoted on the shoe and having a plurality of surfaces of engagement formed successively along substantially its entire periphery at gradually increasing radial distances from its pivotal axis, a selected one of said surfaces of engagement of said element being maintained in contact with the surface of engagement of the anchored member, the structure of said element being such that a perpendicular from the pivotal axis of said element to the surface of engagement of said anchored member passes through whichever surface of engagement on the periphery of said element is at the time in contact with the surface of engagement of said anchored member, said element being movable about its pivotal axis to bring a different surface of engagement of said element into contact with the surface of engagement of said anchored member, changing the distance between said anchored member and the pivotal axis of said element and thereby adjusting the relative positions of the shoe and the anchored member, the radial distance between the pivotal axis of said element and the corner formed between any two adjacent surfaces of engagement of said element being greater than the radial distance between said axis and the more distant of said two adjacent surfaces of engagement, whereby the element in turning during adjustment spaces the shoe from the anchored member according to the radius at said corner and subsequently lessens the spacing between the shoe and anchored member in adjusted position, thus insuring a certain clearance between the shoe and the drum after adjustment.

8. In a brake having a drum, a shoe movable into frictional engagement with said drum to resist rotation thereof, actuating means for moving said shoe into frictional engagement with said drum, resilient means yieldably opposing said actuating means and normally maintaining said shoe in released position out of contact with said drum, and an anchored member having a surface of engagement thereon: an adjustor for adjusting the released position of the shoe to compensate for shoe wear comprising an element movable to effect relative movement between the shoe and the anchored member, said element being pivoted on the shoe and having a plurality of surfaces of engagement formed successively along its periphery at gradually increasing radial distances from its pivotal axis, a selected one of said surfaces of engagement of said element being maintained in contact with the surface of engagement of the anchored member, said element being movable about its pivotal axis to bring a different surface of engagement of said element into contact with the surface of engagement of said anchored member, changing the distance between said anchored member and the pivotal axis of said element and thereby adjusting the relative positions of the shoe and the anchored member, the radial distance between the pivotal axis of said element and the corner formed between any two adjacent surfaces of engagement of said element being greater than the radial distance between said axis and the more distant of said two adjacent surfaces of engagement, by an amount substantially equivalent to the desired clearance between the shoe and drum after adjustment.

9. In a brake having a drum, a shoe member movable into frictional engagement with said drum to resist rotation thereof and having a nonmetallic lining as its engaging surface, actuating means for moving said shoe member into frictional engagement with said drum, an anchored member, and resilient means urging one end of the shoe member toward the anchored member: an adjustor for adjusting the released position of the shoe member to compensate for shoe wear comprising an element movable to effect relative movement between the shoe and the anchored member, said element being pivoted on one of said members and having a plurality of surfaces of engagement formed successively along its periphery at gradually increasing radial distances from its pivotal axis, the difference in radial distance of any two consecutive surfaces of engagement from said pivotal axis being substantially equivalent to the thickness of shoe lining representing one stroke of the operating means assuming the required reserve, a selected one of said surfaces of engagement of said element being maintained in contact with a surface of engagement of the other of said members, said element being movable about its pivotal axis to bring a different surface of engagement of said element into contact with the surface of engagement of said other member, changing the distance between said other member and the pivotal axis of said element and thereby adjusting the relative positions of the shoe and anchored members.

10. In a brake having a drum, a shoe movable into frictional engagement with said drum to resist rotation thereof and having a non-metallic lining as its engaging surface, actuating means for moving said shoe into frictional engagement with said drum, an anchored member having a surface of engagement thereon, and resilient means urging one end of the shoe toward the anchored member: an adjuster for adjusting the released position of the shoe to compensate for shoe wear comprising an element movable to effect relative movement between the shoe and the anchored member, said element being pivoted on the shoe and having a plurality of surfaces of engagement formed successively along its periphery at gradually increasing radial distances from its pivotal axis, the difference in radial distance of any two consecutive surfaces of engagement from said pivotal axis being substantially equivalent to the thickness of shoe lining representing one stroke of the operating means assuming the required reserve, a selected one of said surfaces of engagement of said element being maintained in contact with the surface of engagement of the anchored member, said element being movable about its pivotal axis to bring a different surface of engagement of said element into contact with the surface of engagement of said anchored member, changing the distance between said anchored member and the pivotal axis of said element and thereby adjusting the relative positions of the shoe and the anchored member, the radial distance between the pivotal axis of said element and the corner formed between any two consecutive surfaces of engagement of said element being greater than the radial distance between said axis and the more distant of said two consecutive surfaces of engagement by an amount substantially equivalent to the desired clearance between the shoe and drum after adjustment.

11. In a brake having a drum, a shoe movable into frictional engagement with said drum to resist rotation thereof, an anchored member having a surface of engagement thereon, and resilient means urging one end of the shoe toward the anchored member, an adjustor for adjusting the released position of the shoe to compensate for shoe wear comprising a plate having a plurality of flat surfaces of engagement along its periphery and a shaft joined to said plate and serving as the pivot therefor, said shaft being cylindrical in form and fitting into a complementary curved groove formed in the end of the shoe, said surfaces of engagement on the periphery of the plate being located at successively increasing radial distances from the pivot shaft, a selected one of said surfaces of engagement of said plate being maintained in contact with the surface of engagement of the anchored member, said shaft being rotatable to bring a different surface of engagement of said plate into contact with the surface of engagement of said anchored member, changing the distance between said anchored member and said shaft and thereby adjusting the relative positions of the shoe and the anchored member.

12. In a brake having a drum, a shoe member movable into frictional engagement with said drum to resist rotation thereof, an anchored member, and resilient means urging one end of the shoe member toward the anchored member, an adjustor for adjusting the released position of the shoe member to compensate for shoe wear comprising a plate having a plurality of slightly outwardly curved surfaces of engagement along its periphery and a shaft joined to said plate and serving as the pivot therefor, said shaft being polygonal in cross-section and fitting into a complementary multi-sided groove formed in one of said members, said surfaces of engagement on the periphery of the plate being located at successively increasing radial distances from the pivot shaft, a selected one of said surfaces of engagement of said plate being maintained in contact with the other of said members, said shaft being rotatable to bring a different surface of engagement of said plate into contact with the said other member, changing the distance between said other member and said shaft and thereby adjusting the relative positions of the shoe member and the anchored member.

13. In a brake having a rotating drum provided with a cylindrical friction surface, a shoe mounted inside said drum comprising a lined arcuate rim parallel to the cylindrical drum and a web lying in a plane substantially perpendicular to the rim, cover means enclosing the open side of the brake drum, support means for receiving the anchoring torque of the shoe, an anchored member having a surface of engagement thereon and adapted to be held stationary by said support means, actuating means for moving said shoe into frictional engagement with said drum, and resilient means urging one end of the shoe toward the anchored member, an adjustor for adjusting the released position of the shoe to compensate for lining wear comprising a pair of identical plates each having a plurality of substantially flat surfaces of engagement along its periphery and a shaft joining said plates and supported by the shoe web, said surfaces of engagement on the peripheries of the plates being located at successively increasing radial distances from the axis of the shaft, said plates lying in planes substantially parallel to the shoe web but at opposite sides thereof and said shaft extending normal to the plates and to the web, said shaft being formed with a socket therein whereby it may be rotated after insertion of a turning tool, said cover means having an opening therethrough substantially aligned with the shaft socket to permit insertion of such a tool, a selected one of said surfaces of engagement of each of said plates being maintained in contact with the surface engagement of the anchored member, whereby turning of the shaft adjusts the relative positions of the shoe and the anchored member, the radial distance between the axis of said shaft and the corner formed between any two consecutive surfaces of engagement of said plates being greater than the radial distance between said axis and the more distant of said consecutive surfaces of engagement by an amount substantially equivalent to the desired clearance between the shoe and drum after adjustment, the structure of said plates being such that a perpendicular from the axis of said shaft to the surface of engagement of the anchored member passes through whichever surface of each of said plates is at the time in contact with the surface of engagement of the anchored member.

14. In a brake having a rotating drum provided with a cylindrical backing surface, a shoe mounted inside said drum comprising a lined arcuate rim parallel to the cylindrical drum and a web lying in a plane substantially perpendicular to the rim, a support plate arranged to receive the anchoring torque of said shoe, an anchored member having a surface of engagement thereon and adapted to be held stationary by means of said support plate, actuating means for moving said shoe into frictional engagement with said drum, and resilient means urging one end of the shoe toward the anchored member: an adjustor for adjusting the released position of the shoe to compensate for lining wear comprising a pair of identical plates each having a plurality of substantially flat surfaces of engagement along its periphery and a shaft joining said plates and supported by the shoe web, said surfaces of engagement on the peripheries of the plates being located at successively increasing radial distances from the axis of the shaft, said plates lying in planes substantially parallel to the shoe web but at opposite sides thereof and said shaft extending normal to the plates and to the web, said shaft being formed to receive a turning tool whereby it may be rotated, a selected pair of said surfaces of engagement of said plates being maintained in contact with the surface of engagement of the anchored member whereby turning of the shaft adjusts the relative positions of the shoe and the anchored member.

15. In a brake having a generally cylindrical rotating drum, a shoe mounted inside said drum comprising a lined arcuate rim parallel to the cylindrical drum and a web lying in a plane substantially perpendicular to the rim, a backing plate lying in a plane substantially parallel to said web and supporting said shoe, an anchored member having a surface of engagement thereon and adapted to be held stationary by means of said backing plate, hydraulic actuating means for moving said shoe into frictional engagement with said drum, and resilient means urging one end of the shoe toward the anchored member, an adjustor for adjusting the released position of the shoe to compensate for lining wear comprising a pair of plates having a plurality of parallel substantially flat surfaces of engagement along their peripheries and a shaft joining said plates and supported by the shoe web, said surfaces of engagement on the peripheries of the plates being located at successively increasing radial distances from the pivot shaft, said plates lying in planes substantially parallel to the shoe web and said shaft extending normal to the plates and to the web, said shaft being formed with a socket therein whereby it may be rotated after insertion of a turning tool, said backing plate having an opening therethrough substantially aligned with the shaft socket to permit insertion of such a tool, a selected pair of said surfaces of engagement of said plates being maintained in contact with the surface of engagement of the anchored member, whereby turning of the shaft adjusts the relative positions of the shoe and the anchored member.

16. In a brake having a rotatable drum, two shoes which are self-energizing in either direction of drum rotation, and two hydraulic cylinders each having two pistons therein which are urged apart by pressure from a hydraulic actuating means to urge both ends of both shoes toward the drum, mechanism for adjusting the released position of the shoes to compensate for shoe wear comprising two adjusting elements, one pivoted on each of the shoes, each of said adjusting elements having a plurality of surfaces of engagement formed successively along its periphery at gradually increasing radial distances from its pivotal axis, the difference in radial distance of adjacent surfaces of engagement from the pivotal axis being substantially equivalent to the thickness of shoe lining representing one stroke of the actuating means assuming the required reserve, a selected one of said surfaces of engagement of each of said adjusting elements being maintained in contact with one of the said pistons, each of said adjusting elements being movable about its pivotal axis to bring a different surface of engagement into contact with the associated piston, changing the distance between the respective shoe and piston and thereby adjusting said shoe to compensate for wear.

17. In a brake having a rotatable drum, two shoes which are self-energizing in either direction of drum rotation, and two hydraulic cylinders each having two pistons therein which are urged apart by hydraulic pressure to urge both ends of both shoes toward the drum, said pistons serving as anchoring means for said shoes, mechanism for adjusting the released position of the shoes to compensate for shoe wear comprising two adjusting elements, one pivoted on each of the shoes, each of said adjusting elements having a plurality of surfaces of engagement formed successively along its periphery at gradually increasing radial distances from its pivotal axis, a selected one of said surfaces of engagement of each of said adjusting elements being maintained in contact with one of the said pistons, each of said adjusting elements being movable about its pivotal axis to being a different surface of engagement into contact with the associated piston, changing the distance between the respective shoe and pistons and thereby adjusting said shoe to compensate for wear, said surfaces of engagement being so formed as to be capable of rectilinear sliding movement relative to the piston which they contact.

18. In a brake having a rotatable drum, a backing plate, two shoes associated with the backing plate which are self-energizing in either direction of drum rotation, means comprising a single hydraulic actuator for simultaneously exerting at points diametrically opposed with respect to the drum pressure urging both shoes radially outwardly toward the drum, said means being adapted to exert its outward pressure on the shoes intermediate their length, and an anchor on the backing plate for anchoring one end of the shoes, mechanism for anchoring the other end of the shoes and adjusting the released position of the shoes to compensate for wear comprising two adjusting elements, each of said adjusting elements having a shaft rotatable with it and serving as its pivot, said shaft extending through an opening in the backing plate, and each of said adjusting elements also having a plurality of surfaces of engagement formed successively along its periphery at gradually increasing radial distances from its pivotal axis, a selected one of said surfaces of engagement of each of the adjusting elements being in contact with the end of one of the shoes when the shoes are in released position, the shaft of each of said adjusting elements being normally anchored against the edge of the respective opening in the backing plate and being movable about its pivotal axis to bring a different surface of engagement into a position to contact the end of the associated shoe, changing the distance between released position of the shoe and the shaft.

19. In a brake having a rotatable drum, a backing plate, two shoes associated with the backing plate which are self-energizing in either direction of drum rotation, means comprising a single hydraulic actuator for simultaneously exerting at points diametrically opposed with respect to the drum pressure urging both shoes radially outwardly toward the drum, said means being adapted to exert its outward pressure on the shoes intermediate their length, and an anchor on the backing plate for anchoring one end of the shoes, mechanism for anchoring the other end of the shoes and adjusting the released position of the shoes to compensate for wear comprising two adjusting elements, each of said adjusting elements having a polygonal cross-section shaft rotatable with it and serving as its pivot, said shaft extending through an opening in the backing plate, one side of which is provided with a plurality of flats to prevent unwonted turning of the shaft, and each of said adjusting elements also having a plurality of surfaces of engagement formed successively along its periphery at gradually increasing radial distances from its pivotal axis, a selected one of said surfaces of engagement of each of the adjusting elements being in contact with the end of one of the shoes when the shoes are in released position, the shaft of each of said adjusting elements being resiliently urged against the side having the flats of the respective opening in the backing plate and being movable about its pivotal axis to bring a different surface of engagement into a position to contact the end of the associated shoe, changing the distance between released position of the shoe and the shaft.

20. In a brake having a rotatable drum, a backing plate, two shoes associated with the backing plate which are self-energizing in either direction of drum rotation, means comprising a single hydraulic actuator for simultaneously exerting at points diametrically opposed with respect to the drum pressure urging both shoes radially outwardly toward the drum, said means being adapted to exert its outward pressure on the shoes intermediate their length, and an anchor on the backing plate for anchoring one end of the shoes, mechanism for anchoring the other end of the shoes and adjusting the released position of the shoes to compensate for wear comprising two adjusting elements, each of said adjusting elements having a shaft rotatable with it and serving as its pivot, said shaft extending through an opening in the backing plate, and each of said adjusting elements also having a plurality of surfaces of engagement formed successively along its periphery at gradually increasing radial distances from its pivotal axis, a selected one of said surfaces of engagement of each of the adjusting elements being in contact with the end of one of the shoes when the shoes are in released position, the shaft of each of said adjusting elements being movable about its pivotal axis to bring a different surface of engagement into a position to contact the end of the associated shoe, changing the distance between released position of the shoe and the shaft.

21. In a brake having a rotatable drum and a substantially non-rotatable member movable into frictional engagement with said drum to resist rotation thereof: means for adjusting the released position of said member comprising an element movable to effect relative movement between said member and another substantially non-rotatable member, said element being pivoted on one of said members and having a plurality of substantially flat surfaces of engagement formed successively along its periphery at gradually increasing radial distances from its pivotal axis, a selected one of said surfaces being maintained in contact with the other of said members when the brake is released, said element being movable about its pivotal axis to bring a different surface of engagement into contact with said member, changing the distance between said member and the pivotal axis of said element and thereby adjusting the relative positions of said substantially non-rotatable members, the difference in radial distance of any two consecutive surfaces of engagement from said pivotal axis being less in one or more of the first stages of adjustment than thereafter, thus providing fine initial adjustment to compensate for manufacturing tolerances followed by coarser service adjustments.

22. In a brake having a rotatable drum and a substantially non-rotatable member movable into frictional engagement with said drum to resist rotation thereof: means for adjusting the released position of said member comprising an element movable to effect relative movement between said member and another substantially non-rotatable member, said element being pivoted on one of said members and having a plurality of substantially flat surfaces of engagement formed successively along substantially its entire periphery at gradually increasing radial distances from its pivotal axis, a selected one of said surfaces being maintained in contact with the other of said members when the brake is released, said element being movable about its pivotal axis to bring a different surface of engagement into contact with said member, changing the distance between said member and the pivotal axis of said element and thereby adjusting the relative positions of said substantially non-rotatable members, said surfaces of engagement being so formed as to be capable of rectilinear sliding movement relative to the member which they contact.

23. For use in a brake having a rotating drum provided with a cylindrical braking surface, a shoe mounted inside said drum comprising an arcuate rim parallel to the cylindrical drum and a web lying in a plane substantially perpendicular to the rim, a support member arranged to receive the anchoring torque of said shoe, an anchored member having a surface of engagement thereon and adapted to be held stationary by means of said support member, actuating means for moving said shoe into frictional engagement with said drum, and resilient means urging one end of the shoe toward the anchored member: an adjustor for adjusting the released position of the shoe to compensate for lining wear comprising a pair of identical plates each having a plurality of surfaces of engagement along its periphery and a shaft joining said plates and supported by the shoe web, said surfaces of engagement on the peripheries of the plates being located at successively increasing radial distances from the axis of the shaft, said plates lying in planes substantially parallel to the shoe web but at opposite sides thereof to embrace said web and said shaft extending normal to the plates and to the web, a selected pair of said surfaces of engagement of said plates being maintained in contact with the surface of engagement of the anchored member whereby turning of the shaft adjusts the relative positions of the shoe and the anchored member.

24. In a brake having a rotating drum provided with a cylindrical braking surface, a shoe mounted inside said drum comprising an arcuate rim parallel to the cylindrical drum and a web lying in a plane substantially perpendicular to the rim, an anchored member having a surface of engagement thereon, actuating means for moving said shoe into frictional engagement with said drum, and resilient means urging one end of the shoe toward the anchored member: an adjustor for adjusting the released position of the shoe to compensate for lining wear comprising a pair of identical plates each having a plurality of substantially flat surfaces of engagement along its periphery and a shaft joining said plats and supported by the shoe web, said surfaces of engagement on the peripheries of the plates being located at successively increasing radial distances from the axis of the shaft, said plates lying in planes substantially parallel to the shoe web but at opposite sides thereof and said shaft extending normal to the plates and to the web, a selected pair of said surfaces of engagement of said plates being maintained in contact with the surface of engagement of the anchored member whereby turning of the shaft adjusts the relative positions of the shoe and the anchored member.

25. In a brake having a shoe comprising an arcuate rim and a web lying in a plane substantially perpendicular to the rim, an anchored member having a surface of engagement thereon, and resilient means urging one end of the shoe toward the anchored member, an adjustor for adjusting the released position of the shoe to compensate for lining wear comprising a pair of plate-like members each having a plurality of surfaces of engagement along its periphery and a shaft joining said plates and supported by the shoe web, said surfaces of engagement on the peripheries of the plates being located at successively increasing radial distances from the axis of the shaft, said plates lying in planes substantially parallel to the shoe web but at opposite sides thereof and said shaft extending normal to the plates and to the web, a selected pair of said surfaces of engagement of said plates being maintained in contact with the surface of engagement of the anchored member whereby turning of the shaft adjusts the relative positions of the shoe and the anchored member.

26. A brake adjustor for adjusting the relative positions of a shoe member and an anchored member of a brake comprising a pair of identical plates each having a plurality of surfaces of engagement along its periphery, a shaft joining said plates and adapted for pivotally mounting the adjustor on one of said members with the plates lying in parallel planes on opposite sides of said one member, said surfaces of engagement on the peripheries of the plates being located at successively increasing radial distances from the axis of the shaft, selected pairs of said surfaces being adapted to contact a surface of engagement on the other of said members whereby turning of the shaft adjusts the relative positions of the two members.

RUDOLPH A. GOEPFRICH.
BRYAN E. HOUSE.

REFERENCES CITED

The following references are of record in the file of this patent:

UNITED STATES PATENTS

| Number | Name | Date |
| --- | --- | --- |
| 2,167,706 | Berno | Aug. 1, 1939 |
| 2,350,878 | Cowell | June 6, 1944 |
| 2,359,732 | Flesch | Oct. 10, 1944 |
| 2,329,095 | White | Sept. 7, 1943 |